US 8,005,483 B2

(12) United States Patent
Casey et al.

(10) Patent No.: US 8,005,483 B2
(45) Date of Patent: Aug. 23, 2011

(54) MOBILE CACHING AND DATA RELAY VECTORING SYSTEMS AND METHODS

(75) Inventors: Steven M. Casey, Littleton, CO (US); Shawn M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 301 days.

(21) Appl. No.: 10/976,022

(22) Filed: Oct. 27, 2004

(65) Prior Publication Data
US 2006/0089157 A1 Apr. 27, 2006

(51) Int. Cl.
H04W 24/00 (2009.01)
H04W 4/00 (2009.01)
H04W 36/00 (2009.01)

(52) U.S. Cl. .............. 455/456.1; 455/432.1; 455/440; 455/441; 709/201; 709/202; 709/203

(58) Field of Classification Search .............. 455/432.1, 455/456.1, 456.2, 456.3, 412.1, 414.1, 414.3, 455/422.1, 440, 441, 442, 443, 517; 709/201, 709/202, 203
See application file for complete search history.

(56) References Cited

U.S. PATENT DOCUMENTS

| | | | |
|---|---|---|---|
| 5,572,221 A * | 11/1996 | Marlevi et al. ............... 342/452 |
| 5,802,460 A * | 9/1998 | Parvulescu et al. ............ 455/92 |
| 6,125,278 A * | 9/2000 | Wieczorek et al. .......... 455/437 |
| 6,711,408 B1 | 3/2004 | Raith |
| 7,103,369 B2 * | 9/2006 | Sato et al. ................ 455/456.3 |
| 7,190,700 B2 | 3/2007 | Choi |
| 2002/0093929 A1 | 7/2002 | Mangold et al. |
| 2002/0107025 A1 | 8/2002 | Oliveira |
| 2003/0117316 A1 * | 6/2003 | Tischer ..................... 342/357.1 |
| 2003/0140115 A1 | 7/2003 | Mehra |
| 2003/0156558 A1 | 8/2003 | Cromer et al. |
| 2003/0233453 A1 | 12/2003 | Lee |
| 2004/0162084 A1 | 8/2004 | Wang |
| 2004/0192342 A1 * | 9/2004 | Ranganathan ............ 455/456.1 |
| 2004/0219932 A1 | 11/2004 | Verteuil |
| 2004/0224665 A1 * | 11/2004 | Kokubo ....................... 455/411 |
| 2004/0259546 A1 | 12/2004 | Balachandran et al. |
| 2005/0122977 A1 * | 6/2005 | Lieberman ................... 370/394 |
| 2005/0153697 A1 | 7/2005 | Patel |
| 2006/0286988 A1 * | 12/2006 | Blume et al. .............. 455/456.1 |
| 2007/0097862 A1 | 5/2007 | Moon et al. |
| 2007/0129072 A1 * | 6/2007 | Yamato et al. ............ 455/422.1 |
| 2008/0032698 A1 * | 2/2008 | Gerstenberger et al. ...... 455/450 |

OTHER PUBLICATIONS

U.S. Appl. No. 10/976,015, Notice of Allowance mailed Oct. 7, 2008, 6 pages.

(Continued)

*Primary Examiner* — George Eng
*Assistant Examiner* — Wesley L Kim

(57) ABSTRACT

The present invention provides systems and methods for providing mobile users with requested resources. In one such method, first and second location indicators for the mobile user are received, with each of the location indicators having a time associated therewith. The method includes calculating a mobile vector of the mobile user using the first and second location indicators, and associating the mobile vector with a first network region and a second network region. A first portion of the requested resource is sent to a first storage device in the first network region, and a second portion of the requested resource is sent to a second storage device in the second network region. The first and second resource portions are sent to the user when the user is in the first and second network regions, respectively.

32 Claims, 8 Drawing Sheets

OTHER PUBLICATIONS

US Patent No. 7,522,634, dated Apr. 21, 2009, 19 pages.
U.S. Appl. No. 10/976,015, Notice of Allowance dated Mar. 12, 2009, 5 pages.
U.S. Appl. No. 10/976,015, Non-Final Office Action dated Dec. 22, 2008, 8 pages.

* cited by examiner

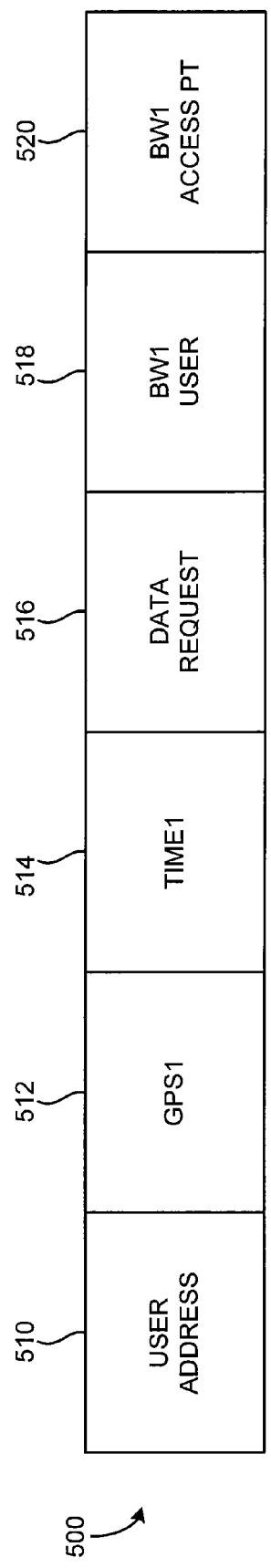
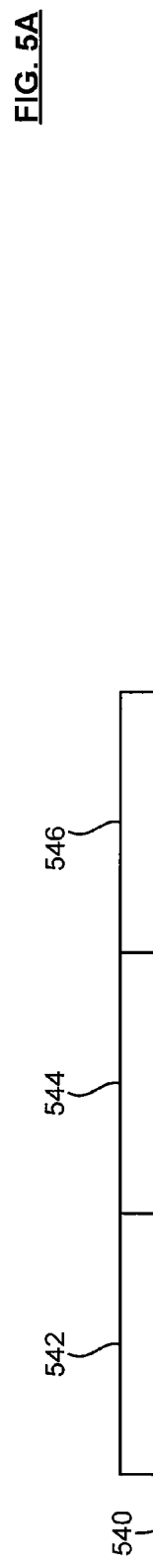
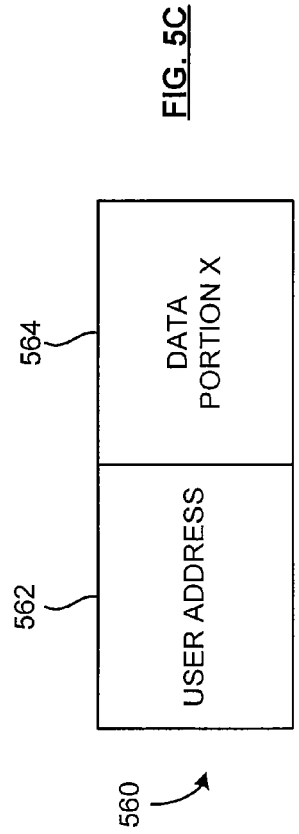
FIG. 5A
FIG. 5B
FIG. 5C

MOBILE CACHING AND DATA RELAY VECTORING SYSTEMS AND METHODS

CROSS-REFERENCE TO RELATED CASES

The present application is related to U.S. application Ser. No. 10/976,015, entitled "User-to-User Data Relay Systems and Methods," filed contemporaneously herewith and assigned to the assignee of the present invention, the complete disclosure of which is incorporated herein by reference.

BACKGROUND OF THE INVENTION

The present invention relates generally to providing users with requested resources, and more specifically, to systems and methods for providing mobile users with requested resources in one or more network regions.

The growth of wireless networks has extended far beyond cellular telephone service. As these networks continue to evolve, the ability to transmit and receive greater amounts of data will be desired. For example, it may be desirable for users to download a movie from a server located at the Blockbuster® store for later viewing that night. Currently, the user must stop at a physical Blockbuster® location to rent the movie in VHS or DVD format. Further, as networks evolve from large broadcast networks to micro and pico cell systems, data fulfillment approaches may need to be modified or developed anew.

BRIEF SUMMARY OF THE INVENTION

The present invention is generally related to providing users with requested resources, and more specifically, to systems and methods for providing mobile users with requested resources. The present invention will be particularly useful for satisfying resource requests from mobile users when the users migrate between multiple cells or regions in a network. The present invention accomplishes some of the methods of the present invention by calculating a mobile vector for the mobile user and associating the mobile vector with one or more network regions to facilitate delivery of the requested resources.

In one embodiment, a method of responding to a resource request of a mobile user includes receiving first and second location indicators for the mobile user, with each of the first and second location indicators having a time associated therewith. The method includes calculating a mobile vector of the mobile user using the first and second location indicators, and associating the mobile vector with a first network region and a second network region. The method further includes sending a first portion of the requested resource to a first storage device in the first network region, sending a second portion of the requested resource to a second storage device in the second network region, sending the first portion to the user when the user is in the first network region, and sending the second portion to the user when the user is in the second network region. In some aspects, the first and/or second portions are sent directly to the mobile user, bypassing the storage device(s). In this manner, the requested resource is sent to the user even when the user is in or passes through more than one network region.

The requested resource can be most any data package or content, including without limitation a movie, a game, an email message, a file, a music selection, other data packages and the like. The request may also be for a real time delivery of the data package. In one aspect, the first and second location indicators each comprises a latitude, a longitude and a time stamp, and alternatively may also include an altitude and/or a direction.

In one aspect, calculating the mobile vector includes calculating a speed and a direction of travel of the user based on the first and second location indicators and the times associated therewith. In some aspects, the mobile vector is associated with the first and second network regions by determining a predicted path of the mobile user, and mapping the predicted path onto one or more regions of a multi-region network, such as a wireless network. The predicted mobile user position may be a stationary position, a moving position, or some combination thereof. In other aspects, the mobile vector is associated with the first and second network regions by comparing the calculated mobile vector with a known prior path of the mobile user.

In one aspect, calculating the mobile vector includes determining the predicted mobile user position portion by comparing the known mobile user position portion with a map. In another aspect, calculating the mobile vector includes determining the predicted mobile user position portion by comparing the known mobile user position portion with a known prior path of the mobile user.

In one aspect, the first and second portions of the requested resource are calculated using the mobile vector and a data rate at which the mobile user can receive data. The calculating also may depend at least in part on predicted first and second lengths of time the mobile user will be in the first and second network regions, respectively. In this manner, the mobile user receives portions of the requested resource from one or more network regions as the user resides in or passes through the region(s). In some aspects, the mobile vector is recalculated periodically, continuously, or the like, such as by receiving a plurality of location indicators for or from the mobile user. In this manner, in one aspect the predicted path of the mobile user can be updated. The mobile user also may send one or more acknowledgments confirming receipt of the first and second portions of the requested resource. In some aspects, some of the first portion of the requested resource may additionally be sent to the user when the mobile user is in the second network region.

In one aspect of the present invention, at least part of the second portion of the requested resource is sent to a storage device in the second network region before the mobile user arrives therein. The second portion is then sent to the mobile user when the mobile user is in the second network region. The storage device may comprise a cache, a server or the like, and may reside at a fixed location or may be mobile.

The present invention further includes mobile devices for connecting to a remote server such as through a wireless network, and computer readable medium containing code for performing the methods of the present invention. In one embodiment, a mobile device according to the present invention includes a processor coupled to a memory and to a Wi-Fi connection. The device has a location determination device, such as a global positioning system (GPS) receiver. In one embodiment, the memory includes code for sending a resource request to the wireless network via the Wi-Fi connection, and code for providing the network a device location using the location determination device. The memory further includes code for receiving a first portion of the requested resource when the mobile device is in a first network region, and for receiving a second portion of the requested resource when the mobile device is in a second network region. In some aspects, the mobile device memory further includes code for sending at least one acknowledgment to the network confirming receipt of the requested resource.

The present invention further provides computer systems for facilitating data transfer to a mobile user. In one embodiment, the system includes a processor coupled to a database and to a computer readable medium. The computer readable medium includes code for performing various methods of the present invention, including receiving resource requests of a mobile user, receiving first and second location indicators for the mobile user, calculating a mobile vector of the mobile user, associating the mobile vector with first and second network regions, calculating first and second portions of the requested resource, and sending the first and second portions to storage devices in the first and second network regions, respectively, for delivery to the mobile user when the user is in the corresponding network region.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

FIGS. 5A-5C depict the data structure used in various transmissions according to an embodiment of the present invention;

DETAILED DESCRIPTION OF THE INVENTION

Figure 1:
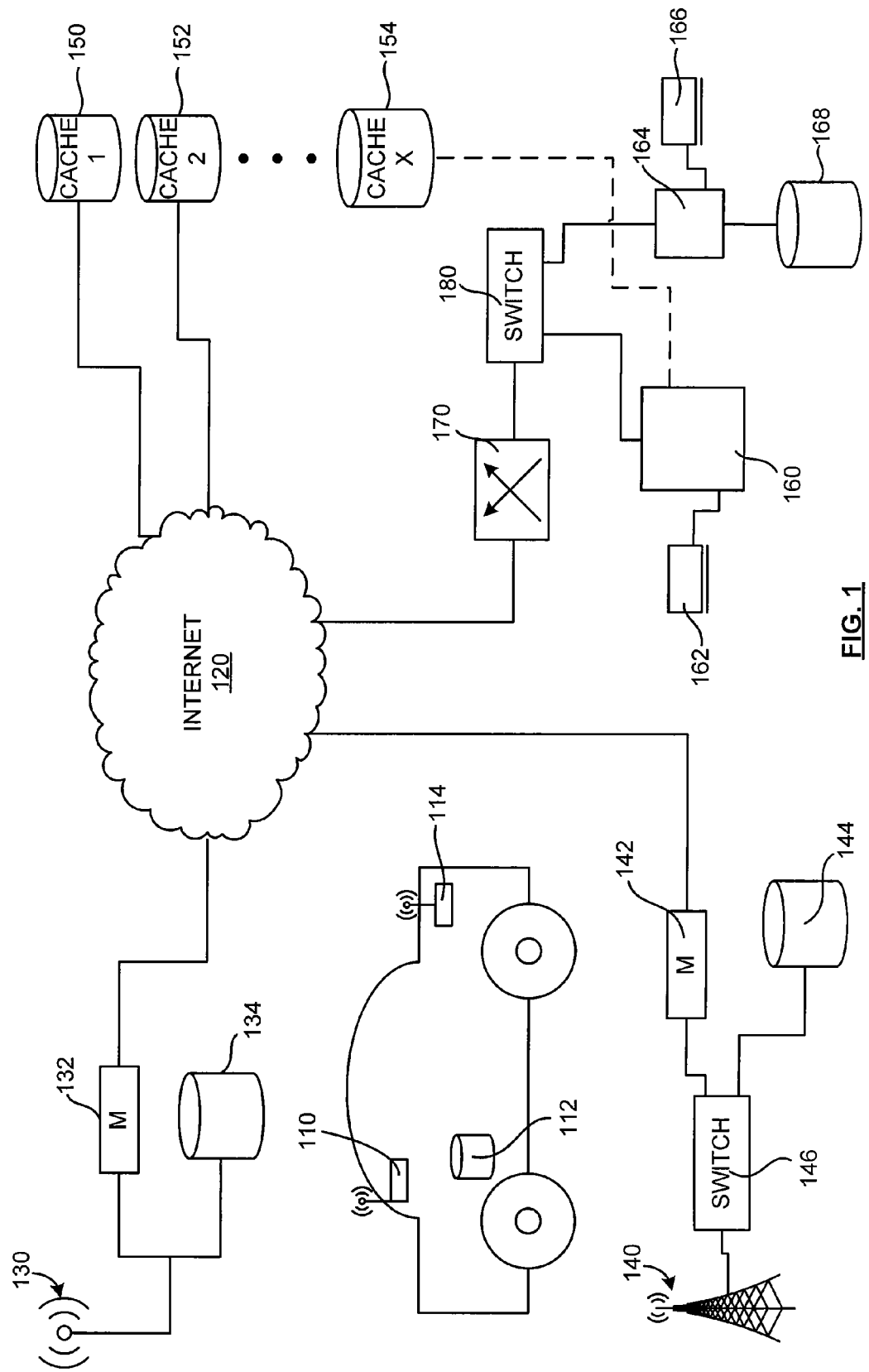
FIG. 1 is a simplified schematic of a system according to the present invention.

With reference to FIG. 1, an embodiment of a system and method for delivering requested resources will be described. As shown in FIG. 1, a mobile user 100 is positioned to interact with the Internet 120 or a variety of networks, including wireless networks, according to methods of the present invention. Mobile user 100 includes a Wi-Fi connection 110 coupled to a cache 112. Cache 112 may be a wide range of memory devices. For example, cache 112 may comprise a server, a computer memory, or the like. Similarly, cache 112 and Wi-Fi connection 110 together may comprise an iPOD, a personal digital assistant (PDA), a laptop computer with a wireless access point, or other device with a wireless or wire line network connection. Further, mobile user 100 has a location determination device 114. In one embodiment, location determination device 114 is a global positioning system (GPS) device, which may include a GPS receiver and associated software, memory, and a processor. In one embodiment, mobile user 100 has a mobile device that includes components 110-114. Alternatively, one or more of connection 110, cache 112, and location determination device 114 are separate devices.

In one embodiment, mobile user 100 wants to receive a resource while mobile user 100 is either stationary or traveling in their vehicle. This requested resource may include most any data package, including without limitation a movie, a game, an email message, a file, a music selection, an audio file, a weather or traffic report, a web page, or the like. In one embodiment, mobile user 100 desires a real time delivery of the data package. This request may occur if mobile user 100 wants to see or hear real time traffic reports while traveling through a busy metropolitan area. The requested resource may reside on any number of systems, represented herein by a series of caches. More specifically, a first cache 150, a second cache 152, up to an $X^{th}$ cache 154 may contain the requested resource. Further, more than one cache together may contain the requested resource. For example, if mobile user 100 requests a web page, the web page content may be stored on cache 150 while advertisements, such as banner advertisements and the like contracted to be displayed with the web page, may be stored on cache 152. In this example, the requested resource is provided by caches 150 and 152.

The requested resource may be delivered to mobile user 100 in a variety of ways within the scope of the present invention. For example, in one embodiment an omni-directional Wi-Fi device 130 transmits the requested resource in all directions extending a prescribed radius from device 130. The prescribed radius may be, for example, one hundred (100) meters in a particular embodiment. In one embodiment, Wi-Fi device 130 receives the requested resource from cache 150 by way of the Internet 120 and, if necessary, a modem 132. The requested resource further may be stored in a cache 134 associated with Wi-Fi connection device 130. In this manner, additional requests for the same resource, such as by subsequent mobile users requesting the same traffic report, may be responded to by transmitting the requested resource as stored in cache 134 without needing to download the resource from cache 150. In one embodiment, the location of Wi-Fi device 130 is known, and may comprise a latitude, a longitude and/or an altitude.

Alternatively, a directional Wi-Fi connection device 140 is used. Generally, such connection devices have greater range, albeit in a particular direction as opposed to all directions. In one embodiment, directional Wi-Fi connection device has a range of about one (1) to five (5) miles, and in a particular embodiment, about three (3) miles. Again, the requested resource may be received at connection device 140 by way of the Internet 120 through a modem 142. Further, the requested resource may be stored in a cache 144 before, during, or after transmission of the requested resource to mobile user 100. A switch 146, which may be an ethernet switch or the like, couples cache 144 with connection device 140 and modem 142. In one embodiment, the location of Wi-Fi device 140 is known, and may comprise a latitude, a longitude and/or an altitude.

In one embodiment of the present invention, a vector controller 160 operates to determine which transmission or connection device 130, 140 should be used to transmit the requested resource to mobile user 100. In the event mobile user 100 is stationary, mobile user 100 will typically receive the requested resource through the transmission device corresponding to the network cell or region in which mobile user 100 resides. However, if mobile user 100 is indeed mobile, mobile user 100 may pass out of the network region or cell before mobile user 100 can receive the requested resource. Thus, in a particular embodiment of the present invention, vector controller 160 operates to direct the transmission of the requested resource to one or more network cells or regions for delivery to mobile user 100, as further described below in conjunction with subsequent figures.

Vector controller 160 may be coupled to an interface device, that in one embodiment is a computer 162. Computer 162 may include a variety of input/output devices, including a graphical user interface (GUI) in one embodiment. Further, in one embodiment, a vector controller 164 may be coupled to a cache or storage medium 168. In this particular embodiment, cache 168 may contain stored user information that, in some embodiments, will be useful for determining which cells mobile user 100 will be entering, thus anticipating a delivery path of the requested resource. Again, vector controller 164 may be coupled to an input device such as a computer 166. A router 170 and a switch 180, such as an ethernet switch or the like, operate to connect the desired vector controller 160, 164 to transmission devices 130, 140 by way of the Internet 120, or other network. Further, vector controllers 160, 164 will be dynamically linked to caches 150-154. In this manner, controller 160, 164 can determine the size of the requested resource prior to transmission thereof to mobile user 100 as further detailed below. In one embodiment, vector controller 160, 164 is a software based controller, having calculator functionality for calculating transmission data rates to user 100, user speed and location, determining which network regions user will be traveling in, and the like. Additional details on some embodiments of vector controllers 160, 164 are discussed in conjunction with FIG. 6.

Figure 2:
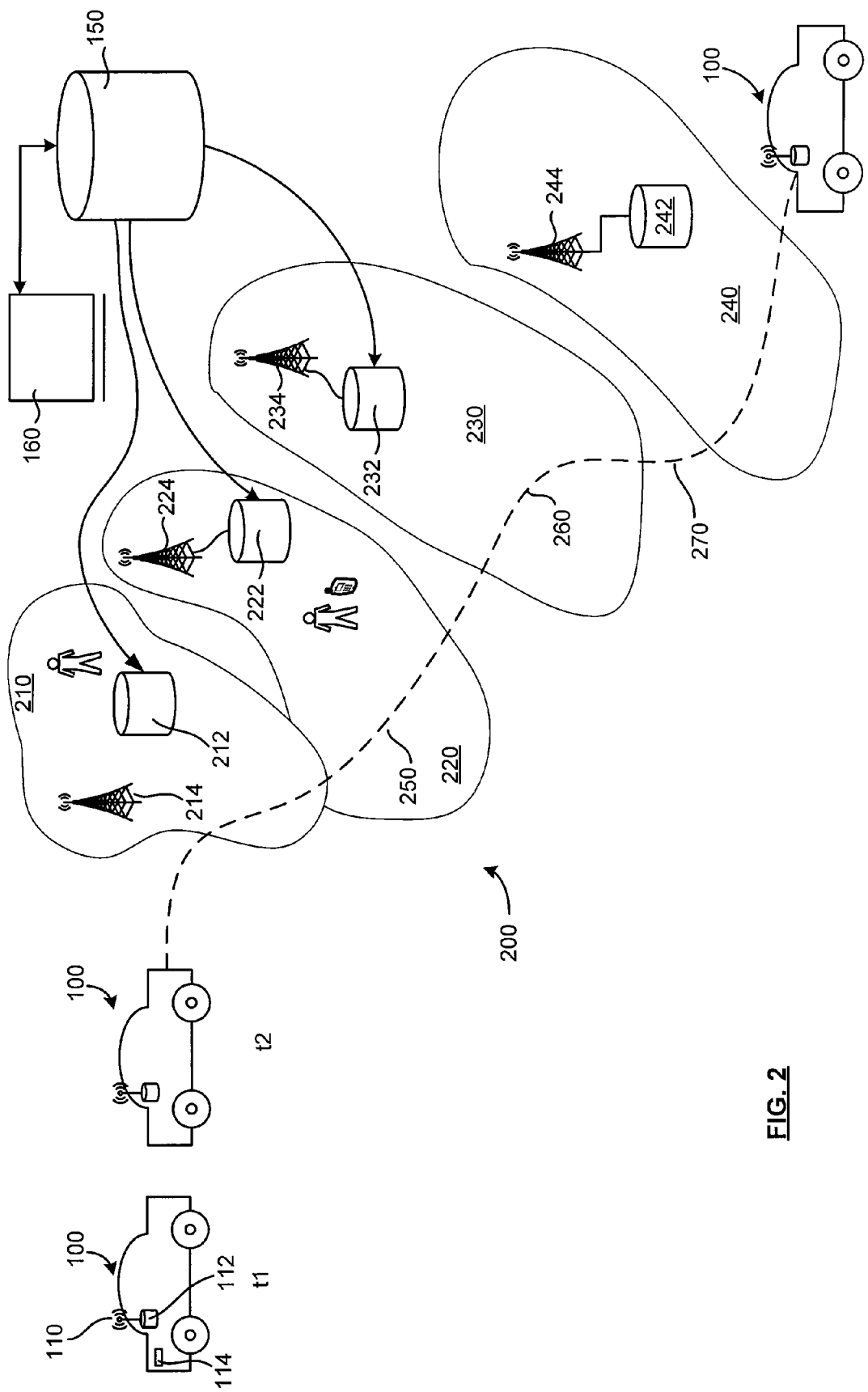
FIG. 2 is a simplified schematic of a mobile user passing through multiple network regions according to methods of the present invention.
Figure 3:
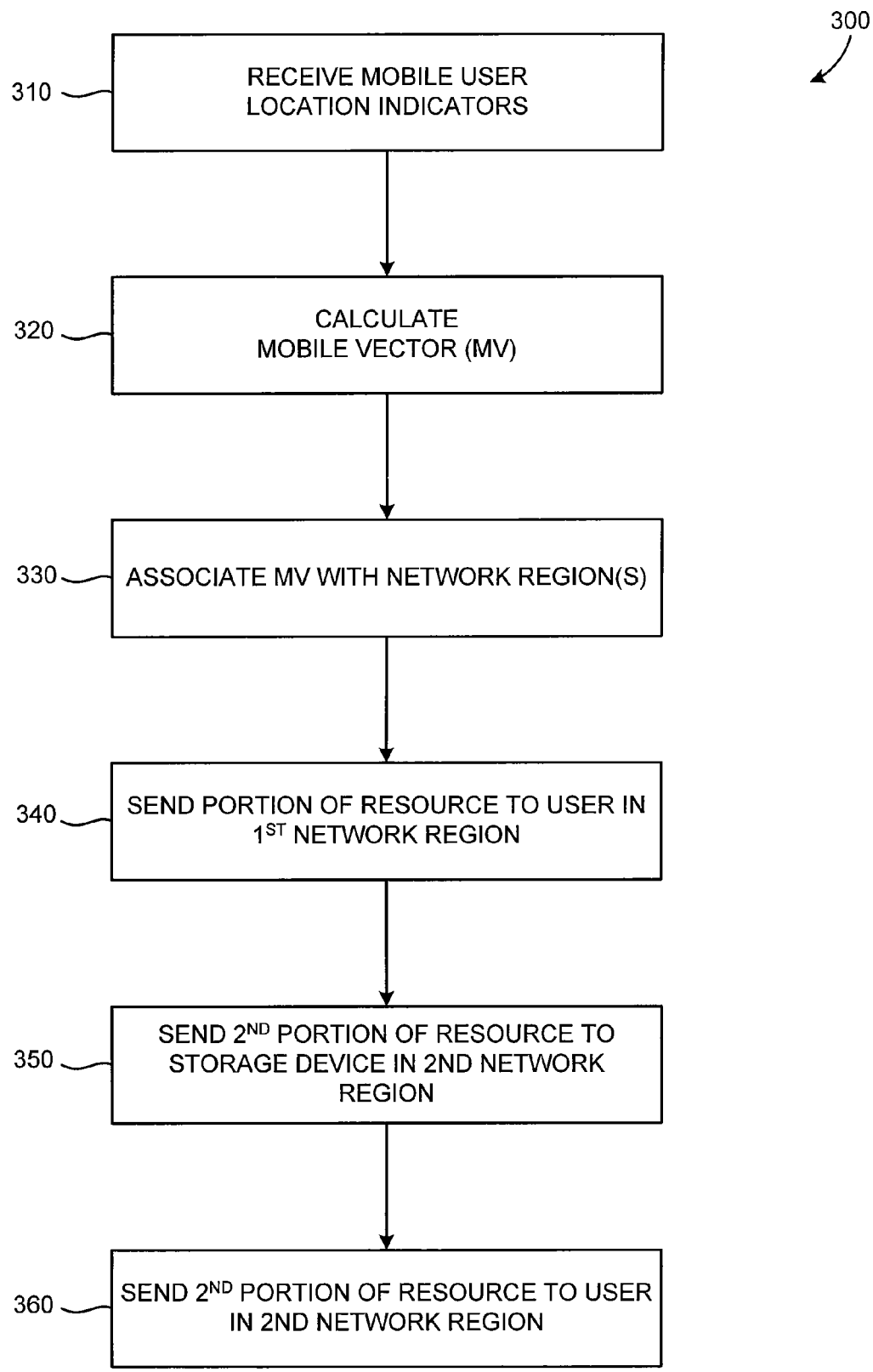
FIG. 3 is a simplified flowchart of a method of delivering a requested resource according to an embodiment of the present invention.

Turning now to FIGS. 2 and 3, an exemplary embodiment of the present invention will be described. In this embodiment, mobile user 100 has a mobile device that includes Wi-Fi connection 110, cache 112, and location determination device 114. Mobile user 100 desires a resource stored on remote server or cache 150. In this embodiment, mobile user 100 transmits a resource request to remote server 150 via a network such as a wireless network. In one embodiment, the request for the resource occurs at a time T1, corresponding to a first mobile user 100 location. Vector controller 160 monitors the resource request and receives a location indicator for mobile user 100. For example, vector controller 160 may be coupled to a network into which mobile user 100 has transmitted their resource request. In one embodiment, the location indicator includes a latitude and a longitude provided by location determination device 114. As previously noted, in a particular embodiment location determination device 114 is a GPS device, including a GPS receiver. In some embodiments, the location indicator further includes an altitude of mobile user 100 and/or a time stamp. In this manner, vector controller 160 is informed of a particular position of mobile user 100 at a particular point in time (T1). In one embodiment, the location indicator is provided to vector controller 160 by mobile user 100. In another embodiment, the GPS satellite system relays the position of mobile user 100 to vector controller 160.

In one embodiment, mobile user 100 further provides a second location indicator to vector controller 160 at a second time (T2). Again, this location indicator may include a latitude, a longitude, an altitude, and/or a time stamp. By receiving two location indicators having the designated characteristics, the speed and direction of travel of mobile user 100 may be estimated. In a particular embodiment, this estimation or calculation produces a vector associated with mobile user 100. In one embodiment, the mobile user vector is calculated by vector controller 160. In a particular embodiment, vector controller 160 receives a plurality of location indicators to update the mobile user vector. The plurality of location indicators may be a continuous stream or nearly continuous stream of location indicators for mobile user 100. In one embodiment, the location indicators are provided in a prescribed time interval (e.g., every 5 seconds, 10 seconds, or the like). In another embodiment, the location indicators are provided to vector controller 160 in an irregular pattern. In one embodiment, instead of two GPS readings, a single GPS reading is received and used in conjunction with a digital compass to determine the mobile user's location and direction of travel.

Vector controller 160 monitors resource requests and determines the size of the requested resource. In a particular embodiment, the resource request initiated by mobile user 100 includes a data rate at which mobile user 100 can receive data. Vector controller 160 may further receive information, or compute data rates for the transmission of data from remote server 150 to one or more storage devices positioned in network regions or cells in the general vicinity of mobile user 100. Vector controller 160 determines how to transmit the requested resource to mobile user 100 by using the mobile vector of mobile user 100, the size of the resource requested, and the associated data rate(s) available for transmission through various portions of the network.

In a particular embodiment, mobile user 100 resides in or passes through a network having a plurality of cells or regions. The use of the term "cell" is not limited to a cell tower location. In one embodiment, network regions include regions or portions of a network accessible by a particular access point. In one embodiment, such as shown in FIG. 2, the network includes at least four network regions 210, 220, 230, and 240. Each network region has a storage device and a transmission device associated therewith. For example, network region 210 includes a storage device 212 and a transmission device 214. Storage device 212 may comprise a server, a cache, or a wide range of devices capable of storing electronic or optical data. Transmission device 214 may comprise a Wi-Fi connection, a transmission tower, WiMax, 2G/2.5G/3G cellular, and the like. Similarly, network region 220 includes a storage device 222 and a transmission device 224, network region 230 includes a storage device 232 and a transmission device 234, and network region 240 includes a storage device 242 and a transmission device 244. While storage devices 212, 222, 232, and 242 are depicted to be similar in nature, each network region may have different storage devices or more than one storage device associated therewith. Similarly, while the transmission devices 214, 224, 234, and 244 are depicted as similar in nature, they too may vary from region to region, and each region may include more than one transmission device. In one embodiment, the location or position of transmission devices 214, 224, 234, and 244 are known or can be determined. Further, while the network regions 210, 220, 230, and 240 are depicted as having minimal to no overlap, some or all of the regions may overlap one another within the scope of the present invention.

In one embodiment, vector controller 160 uses the location indicators and the times associated therewith to calculate the mobile vector for mobile user 100. The mobile vector may include the speed and direction of travel of mobile user 100 and may be updated periodically or on a continuous or nearly continuous basis. In a particular embodiment, the calculated mobile vector includes a known location of mobile user 100. For example, this may comprise comparing the locations of mobile user 100 at times T1 and T2, and extrapolating a travel path between the two locations. Calculating the known portion of the mobile vector may also include comparing the point positions provided by first and second location indicators received for mobile user 100 and comparing those indicators with a street map or the like. Vector controller 160 has a mapping function or mapping database in one embodiment.

In another embodiment, vector controller 160 calculates a predicted path of mobile user 100. This may be accomplished in a number of ways within the scope of the present invention. For example, in one embodiment vector controller 160 predicts the direction of travel and speed of mobile user 100 to remain constant relative to the prior two or more mobile user positions provided by the location indicators. This approach may be particularly accurate in the event vector controller 160 receives nearly continuous updates of the mobile user 100 position. In another embodiment, vector controller 160 calculates the predicted position of mobile user 100 by comparing the known mobile vector portion for mobile user 100 with a street map. This will be particularly useful in the event mobile user 100 is traveling by car, plane, train, bus, motorcycle, or other vehicle and uses known streets, roadways, rail lines, or airways. In this manner, vector controller 160 can determine on which streets mobile user 100 is traveling, and predict the continued course of mobile user 100. In another embodiment, vector controller 160 has a database associated therewith for storing prior known paths of travel for mobile user 100. For example, mobile user 100 may take the same one or few streets while traveling between home and work. In one embodiment, the database associated with vector controller 160 stores these known paths for a particular mobile user, associating the known paths to mobile user 100 by a designated user identification or other mobile user indicator. In this embodiment, vector controller 160 uses one or more location indicators for mobile user 100 to determine which path mobile user 100 is expected to be traveling. In another embodiment, vector controller 160 may assume mobile user 100 is on the path corresponding to the route typically traveled on a particular day of the week. For example, if the resource request is received from mobile user 100 on a Monday, and mobile user 100 travels to work on the same path on Mondays, vector controller 160 can predict the path of mobile user 100 for at least a period of time.

By predicting and/or calculating the direction and/or speed of mobile user 100, vector controller 160 can control the transmission of the requested resource from database or remote server 150 to mobile user 100. More specifically, in tone embodiment, the requested resource is broken into one or more segments or portions to be transmitted to mobile user 100 as mobile user 100 travels along a predicted path. For the embodiment shown in FIG. 2, a first portion of the requested resource is transmitted to storage device 212 within network region 210. This first portion of the requested resource is then transmitted to mobile user 100 using transmission device 214 as mobile user 100 passes through network region 210. In another embodiment, the first portion of the requested resource is transferred directly to mobile user 100, bypassing storage device 212 as mobile user 100 passes through network region 210. Similarly, a second portion of the requested resource may be transmitted to storage device 222 in network region 220. In a particular embodiment, this transmission occurs prior to mobile user 100 entering network region 220. In this manner, a portion of the requested resource is pre-populated into storage device 222 prior to mobile user 100 entering network region 220. Then, as mobile user 100 passes from network region 210 into network region 220, transmission device 224 transmits the second portion of the requested resource from cache 222 to mobile user 100. In a similar fashion, third and fourth portions of the requested resource are pre-populated into network regions 230 and 240, and more specifically into storage devices 232 and 234. Again, as mobile user 100 passes through network regions 230 and 240, the third and fourth portions of the requested resource are transmitted to mobile user 100 using transmission devices 234, 244. The transmitted portions of the requested resource are received by mobile user 100 via Wi-Fi connection 110, and stored in mobile user cache 112.

As shown in the example in FIG. 2, there may be portions of the predicted path of mobile user 100 that fall outside designated network regions. At these times, mobile user 100 may not be receiving portions of the requested resource. In one embodiment, mobile user 100 sends acknowledgments back into the network, confirming receipt of various portions of the requested resource. In a particular embodiment, the acknowledgments transmitted are standard or modified TCP/IP acknowledgments, and confirm receipt of various portions of the requested resource.

In one embodiment, the portions of mobile user's travel between network regions may be used for the confirmation of the receipt by mobile user 100 of portions of the requested resource. In this manner, vector controller 160 may direct portions of the requested resource to be re-transmitted by subsequent network regions in the event mobile user 100 failed to receive, or did not receive all of the portions of the requested resource sent to mobile user 100 while the user passes through earlier network regions. In another embodiment, portions of the requested resource are not sent to all anticipated network regions through which mobile user 100 will pass. In this manner, vector controller 160 may control the distribution of the requested resource to accommodate network congestion or other factors that may slow the transmission of the requested resource to mobile user 100. For example, the first portion of the requested resource may be sent to network region 220 and the second portion of the requested resource may be sent to network region 240 for subsequent receipt by mobile user 100.

A particular embodiment of the present invention is depicted in FIG. 3. The embodiment shown in FIG. 3 describes a method 300 for transmitting a requested resource to a mobile user. In this embodiment, this method includes receiving mobile user location indicators (Block 310), and calculating a mobile vector of mobile user 100 (Block 320). The mobile vector is associated with one or more network regions (Block 330). A first portion of the resource is sent to the user while mobile user 100 is in the first network region (Block 340), and a second portion of the resource is sent to a storage device in the second network region (Block 350). The second portion of the resource is sent to mobile user 100 when the user is in the second network region (Block 360). In this manner, the requested resource is broken into a desired number of components and transmitted to mobile user 100 as the user passes through multiple network regions. It will be appreciated by those skilled in the art that the procedures identified in method 300 may not necessarily be performed in the order indicated. Further, in some embodiments, other procedures or steps are inserted between the procedures indicated in FIG. 3, or certain procedures may be eliminated from the depicted method. For example, in one embodiment a user authentication step occurs to confirm a user identity before transmitting a requested resource. In another embodiment, the transmissions are encrypted before being sent.

Figure 4B:
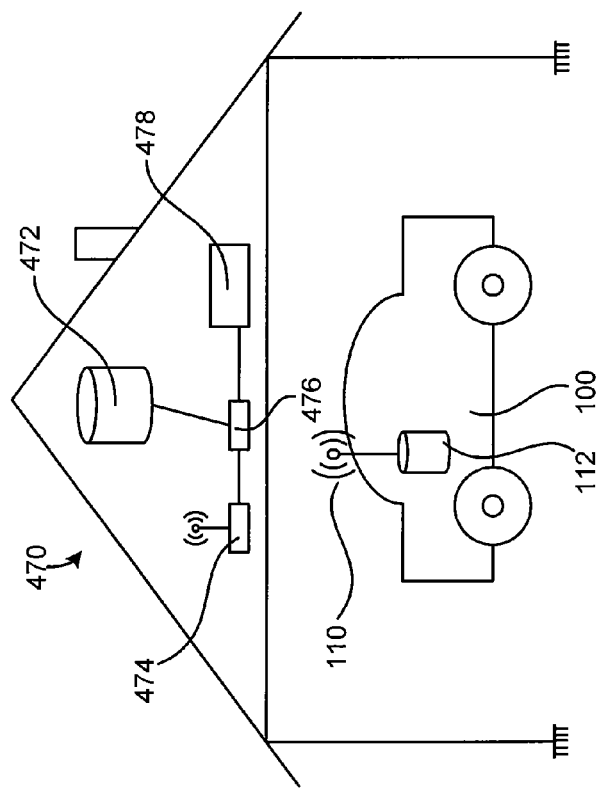
FIGS. 4A-4B schematically depict alternative embodiments of the present invention.
Figure 4A:
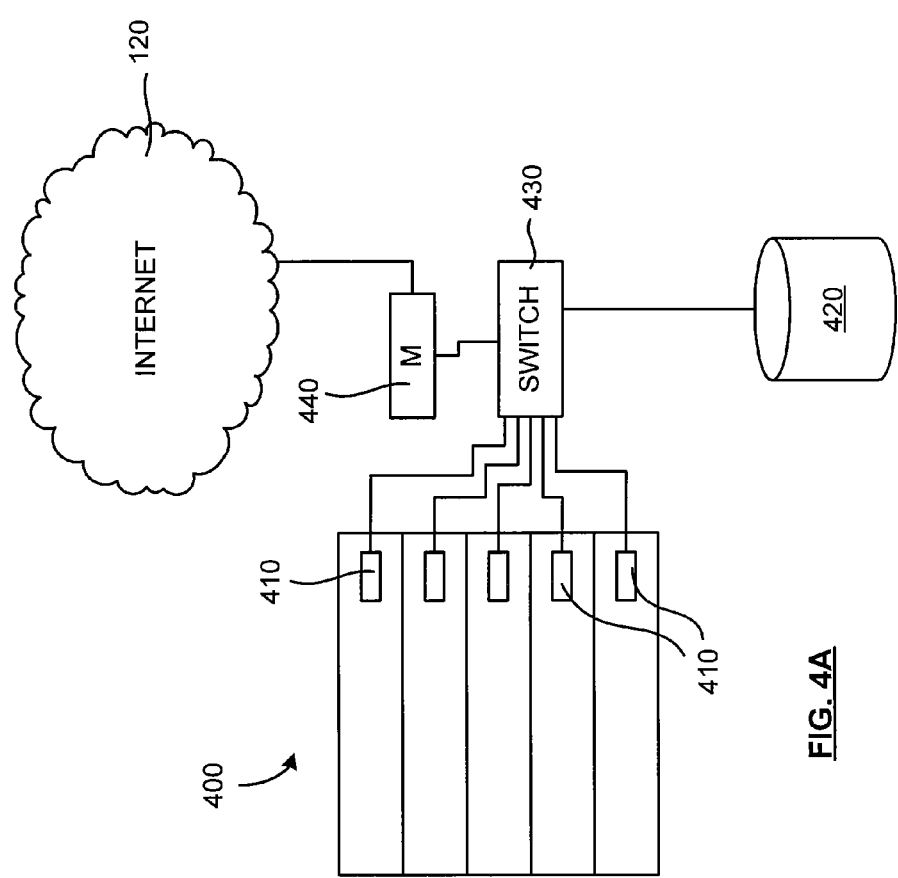

Turning now to FIGS. 4A-4B, alternative embodiments of the present invention will be described. In the embodiment shown in FIG. 4A, a mobile user may be positioned at a stationary location such as in a parking structure 400. In this embodiment, a plurality of Wi-Fi connections 410 are positioned within structure 400. Wi-Fi connections 410 may be fixed Wi-Fi access points, Wi-Fi connection points associated with other vehicles or mobile users, or the like. In this embodiment, at least one of the Wi-Fi access points 410 is associated with mobile user 100. Mobile user 100 requests a particular resource, such as by sending a request through the Internet 120. The Internet 120 may be coupled to the Wi-Fi access points 410 by way of a modem 440, and a switch 430. In one embodiment, resources requested by the mobile users in parking structure 400 may be stored in a cache 420 or other data storage device associated with parking structure 400, or in close proximity thereto. The requested resource is then transmitted to the mobile user in parking structure 400.

In a particular embodiment, a mobile user disposed within parking structure 400 requests a resource that is already contained in cache 420. For example, the mobile user may request a resource previously requested by another mobile user within parking structure 400 and stored in cache 420. In one embodiment, the mobile user may be requesting the download of a recently-released movie in lieu of going to a video rental store such as Blockbuster®. The requested resource or movie is downloaded to the mobile user while the mobile user's vehicle is parked within structure 400. In some embodiments, the resources stored on cache 420 have time stamps or other features that limit the number of times they can be copied, the number of times they can be viewed, and the like. For example, if a single user downloads a particular movie while in parking structure 400, and the movie is saved on cache 420, the movie resource may be deleted from cache 420 after a designated period, such as one hour, one day, or the like. In this manner, the server or service that provides access to the requested resource (e.g., movie) maintains some control over the movie's distribution. Other Digital Rights Management (DRM) techniques also may be used within the scope of the present invention to control use of the requested resource by mobile users.

In a particular embodiment, mobile user 100 downloads requested resources for subsequent viewing at work or home. In the embodiment shown in FIG. 4B, the mobile user 100 has arrived at home and parks in or near the user's residence or in mobile user 100's garage. Wi-Fi connection 110 uploads the resource from cache 112 to a stationary Wi-Fi connection 474 associated with mobile user's garage, residence, workplace, or the like. Using a modem 476 or other appropriate interface, the requested resource is stored in a home cache 472. Home cache 472 may be a computer, a server, a digital storage device, or the like. The requested resource then may be displayed on any appropriate appliance 478 such as a television, computer, or the like. Requested resources received during travel by mobile user 100 may be viewed when the mobile user arrives at the intended destination. In this manner, mobile user 100 is not distracted by real time viewing of the requested resource.

In another embodiment, real time viewing of or listening to the resource is desired, such as when the requested resource is a weather report, traffic report, or the like. Further, in another embodiment, mobile user 100 is traveling interstate or intrastate and desires to have a movie, for example, viewed by occupants of the mobile user's vehicle. Mobile user 100 downloads the movie and displays it on appropriate appliances within mobile user's vehicle. For example, DVD screens and other viewing apparatus are available from many vehicle manufacturers or as after market products so vehicle occupants can watch movies, play video games, or the like. In this particular embodiment, a desired movie is downloaded for viewing during travel in mobile user's vehicle.

While the present invention is described in conjunction with particular embodiments, those skilled in the art will appreciate that other embodiments also exist within the scope of the present invention. For example, stationary caches 212, 222, 232, and 242 described in conjunction with FIG. 2 may reside at any number of locations. For example, the caches may reside at fixed locations such as restaurants (e.g., McDonalds®, Starbucks®, or the like), banks, service stations, and any number of institutions that have widespread distribution throughout metropolitan areas. For mobile or stationary caches that exist in metropolitan areas, it may be desirable to pre-populate the cache with popular or desirable items. For example, caches 410 shown in FIG. 4A may be loaded with weather reports, traffic reports, or the like. As mobile users get in their vehicles to drive home, they can readily download the desired resources. In another example, caches 212, 222, 232 and/or 242 may be populated with popular or commonly requested resources., Again, these resources may be most anything, including weather reports, traffic updates, news headlines, sports scores, advertisements, and the like. In this manner, when mobile user 100 requests such a resource, the resource may be readily sent to user 100 by transmission devices 214, 224, 234, 244, or the like.

In one embodiment, the mobile vector is updated on a regular basis. In this manner, changes in a mobile user's direction, speed, and the like can be factored into the mobile vector calculation. Similarly, the association of the mobile vector with desired network regions, and the calculation of portions of the data requested can be updated. For example, if a mobile user is stuck in traffic, additional portions or segments of the requested resource may be downloaded to the mobile user by way of the same cache, instead of pre-populating caches in other network regions that would be otherwise needed if the mobile user were traveling at a normal rate of speed. Further, monitoring the mobile user position and updating the mobile vector and its association with the network regions can further accommodate alternative routes taken by the user, intermediate stops of the user (such as stoplights or to run errands), as well as the changing speeds of the mobile user. Additionally, the above-noted changes or variations to a mobile user's direction and speed may be useful for calculating which parts of the requested resource have been received by the mobile user. For example, if the initial vector calculation determines that the requested resource needs to be split across three network regions, but this calculation occurs when the mobile user is traveling at a slow rate of speed, the calculation may need to be updated in the event traffic breaks free or the mobile user is able to increase the rate of speed such that mobile user will pass through the three network regions more quickly and not receive the full requested resource.

Turning now to FIGS. 5A-5C the data structure for various communications according to embodiments of the present invention will be described. For example, FIG. 5A depicts a data structure 500 applicable to a resource request issued by mobile user 100. As shown in FIG. 5A, the resource request will include a user address 510, a global positioning system (GPS) address 512 and a time stamp (Time 1) 514. The GPS and time stamps will correspond to the user's location at a particular point in time. The user address 510 will correspond to the user's logical address, such as an IP address, MAC address, or the like. Data structure 500 includes the data request 516. This data request may include, for example, the name of a file, a movie, or the like being requested by mobile user 100. Further, in one embodiment, data structure 500 includes the bandwidth of the user to the network access point 518 and the bandwidth of the access point to the user 520. These bandwidths may comprise the speed at which the user can transmit and receive data from the mobile user's Wi-Fi connection 110 to the network access point. Again, the access point may comprise a wide range of access points, including transmission terminals 130 and 140 (FIG. 1), connection devices 214, 224, 234, 244 (FIG. 2) or access points 410 (FIG. 4A).

FIG. 5B depicts a data structure for transmission of at least a portion of the requested resource from the main cache or remote server to the mobile or stationary cache identified to deliver the requested resource portion to the mobile user. Data structure 540 may include the receiver cache address 542, that is the address for the mobile or stationary cache. Data structure 540 includes at least a portion of the requested resource 544 as well as the user address 546. With reference to FIG. 1, the receiver cache address may comprise, for example, the address for cache 134 or 144, depending upon which access point 130 or 140 will be used to transmit data to mobile user 100. Similarly, user address 546 will comprise the address for mobile user 100.

FIG. 5C depicts a data structure 564 for the transmission of at least a portion of the requested resource to mobile user 100. For example, data structure 560 is shown as including a portion of the requested resource 564 and the user address 562. The user address 562 again is similar to or identical to user addresses 510 and 546 depicted in FIGS. 5A and 5B, respectively. In this manner, portions of the requested resource are transmitted to mobile user 100, and are received by mobile user 100 as designated by user address 562.

Figure 6:
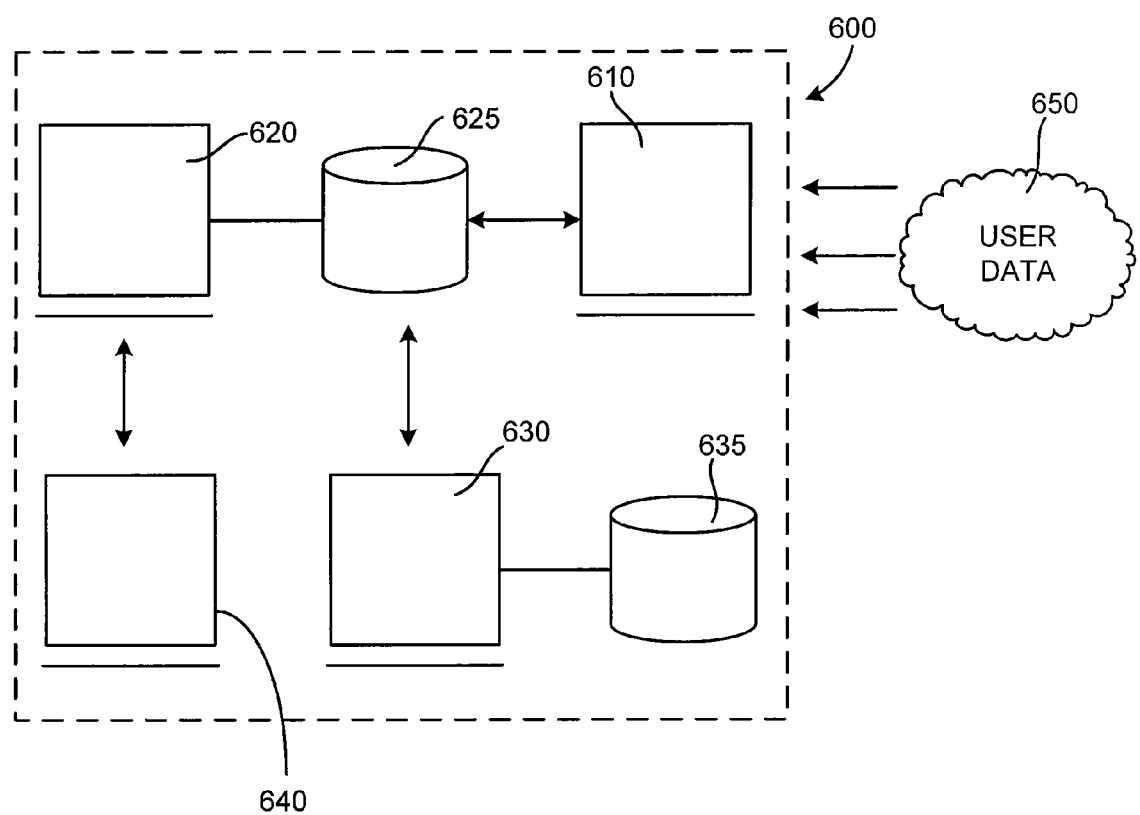
FIG. 6 is a simplified schematic of a vector controller for use with some embodiments of the present invention.

FIG. 6 depicts one embodiment of a vector controller 600 according to the present invention. Vector controller 600 may be identical or similar to vector controllers 160, 164 described in conjunction with earlier figures. Vector controller 600 tracks the movement of mobile users to coordinate the transmission of requested resources to the mobile users. To do so, vector controller 600 receives user data 650 related to the mobile user. In one embodiment, user data 650 may be similar to data 500 depicted in FIG. 5A. For example, user data 650 may include location indicators that comprise, in one embodiment, user address 510, global positioning system (GPS) address 512, and time stamp 514. User data 650 may be transmitted periodically, continuously, near continuously, or intermittently to vector controller 600 in alternative embodiments.

Vector controller 600 calculates or tracks the movement of mobile users and data through a network, and facilitates the fulfillment of resource requests by acting as a centralized or decentralized locator application. In one embodiment, vector controller 600 resolves user requests for resources or content by matching the user with the closest or least cost fulfillment options. The cost may be determined by network costs, network metrics (e.g., the number of transmission segments between the user and the resource storage location), and/or content transfer pricing. Vector controller 600 determines the mobile user's movement through the network portions or cells, and facilitates the pre-positioning of content at various transmission locations so it is available when the user arrives. The time stamps on the updated GPS locations for the mobile user and the time between location updates, helps vector controller 600 to determine how fast the user is moving between caches, network regions, and/or wireless access points. System data transfer speed, that may include the ability of the mobile user to receive data as well as the transmission rates between various points within the network, helps allow vector controller 600 to determine the size of data packages to send to the mobile user. In one embodiment, each data segment or package may comprise any number of TCP/IP packets. Other packet formats also may be used within the scope of the present invention.

FIG. 6 depicts one embodiment of vector controller 600 according to the present invention. It will be appreciated by those skilled in the art that alternative embodiments of vector controller 600 also fall within the scope of the present invention. In the depicted embodiment, vector controller 600 includes a user and cache location mapper 610. Location mapper 610 stores GPS coordinates of stationary and mobile caches. For example, location mapper 610 may contain a list or table of transmission devices 214, 224, 234, 244 and their corresponding location. The location for the transmission devices may include a latitude, a longitude, and/or an altitude. Location mapper 610 further receives location indicators related to the mobile user to help track the mobile user's movement through the network. The location indicators include latitude, longitude, altitude, and/or a time stamp in some embodiments. Further, in one embodiment, location mapper 610 tracks the movement of multiple mobile users through the network.

Vector controller 600 further includes a user data server 620 coupled to a database 625. In one embodiment, user data server 620 and database 625 store information related to users who have access to the system. This information may include user names, passwords, access charges, user profiles, preferences, and the like. In one embodiment, database 625 further includes data related to the mobile user's predicted or past travel paths. For example, as previously noted, if a mobile user typically drives one or two routes between work and home, this information may be stored and updated periodically within database 625. In one embodiment, database 625 will link to a content tracking database 635 that is coupled to a content packaging engine 630. Content tracking database 635 helps track which caches or servers within a network have content, and act on user requests for the content. Database 635 may further store the content or resources retrieved on behalf of the mobile users. In one embodiment, database 635 contains a list, record, or table of resources sent to user X, which user X may subsequently make available to other mobile users as described further below in conjunction with FIG. 7. Content packaging engine 630 takes the mobile user resource requests and communicates with location mapper 610 to determine where the mobile user is, and communicates with content tracking database 635 to determine where the user-requested resource is stored. Content packaging engine 630 then communicates with user data server 620 to determine the mobile user's system data transfer speeds based, in one embodiment, on GPS location and time stamps. In one embodiment, this data is received between user requests to the wireless access points. With this information, content packaging engine 630 packages the content or resource into appropriate size packages or segments which the mobile user can efficiently receive. In addition, content packaging engine 630 transfers the resource packages or segments to caches within the network based on the predicted path of the mobile user by way of location mapper 610. Again, this may be at least partly based on stored or derived user paths received from user data server 620 and database 625.

Vector controller 600 may further include one or more user interfaces 640. In one embodiment, interface 640 is used for configuration control. Vector controller 600 configuration may be performed through, for example, a web-based graphical user interface (GUI) by way of a web browser or similar interface. In addition, a CLI interface may be included. In a particular embodiment, web servers are supported on all components 610-640 to support configuration changes to the various components of vector controller 600. Communication between the servers associated with vector controller 600 may be accomplished via eXtensible Markup Language (XML), or similar data passing languages. Interfaces 640, in one embodiment, support user-to-user and computer-to computer interfaces to automate the recommendation of content as well as to support content conversion functions. Database engines 620, 630 may include MySQL server, Oracle database servers, or the like. In this manner, vector controller 600 helps coordinate the transmission of requested data from various data storage locations throughout the network to a user by sending the data segments directly to the user or by pre-populating various cache locations so that the mobile user can receive portions of the requested resource as the mobile user enters network regions serviced by the various cache locations.

Figure 7A:
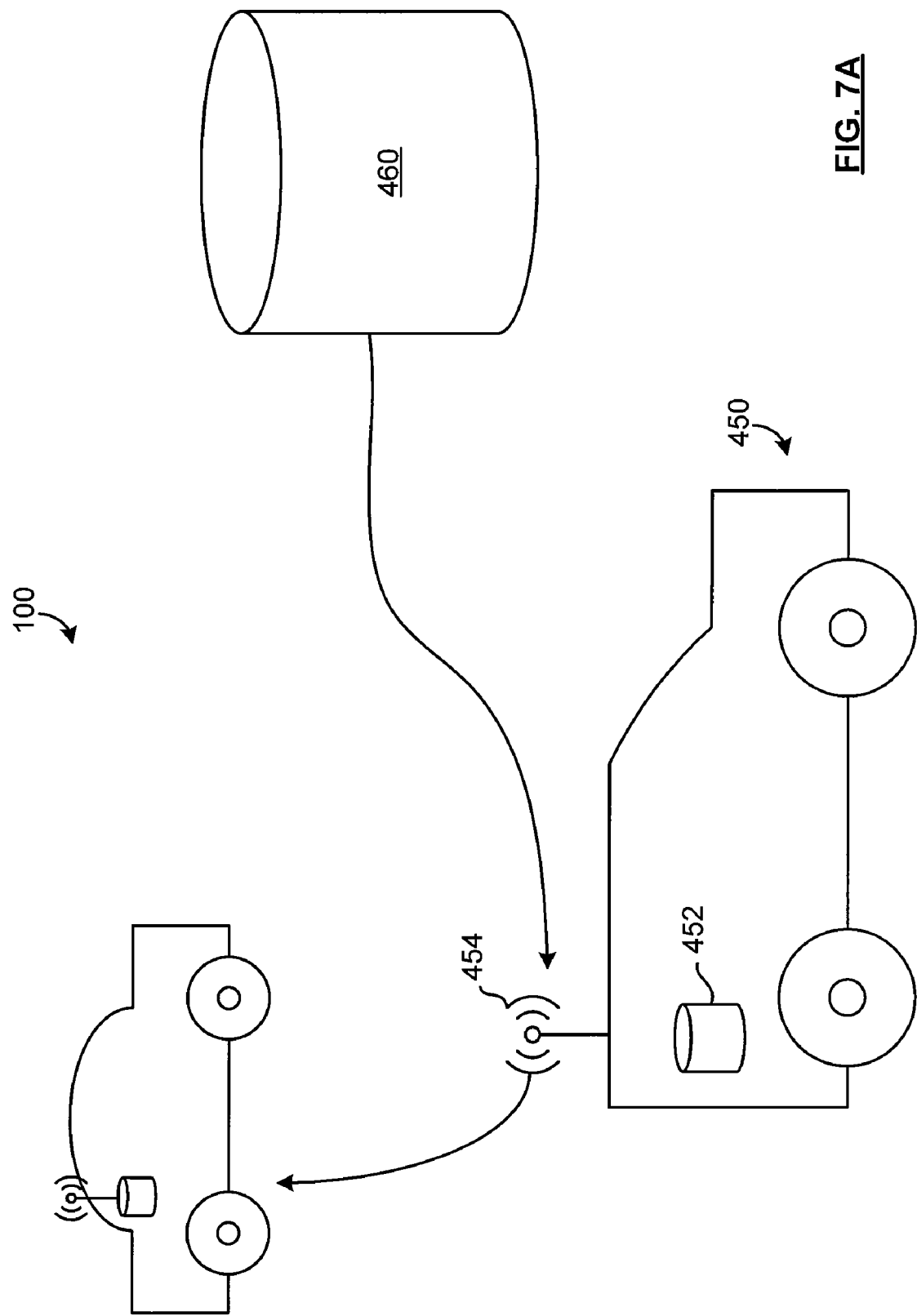
FIG. 7A schematically depicts an alternative embodiment of the present invention.

In another embodiment as shown in FIG. 7A, mobile user 100 may request a resource that has been previously requested by a second mobile user 450. For example, mobile user 450 may have requested the downloading of a web page, a traffic report, a weather report, or the like, that is subsequently requested by mobile user 100. In this embodiment, the remote server or cache 460 containing the requested resource and/or the vector controller is aware of mobile user 450's prior request for the same resource. Instead of having a vector calculator determine the plurality of network regions across which the resource needs to be forwarded to mobile user 100, the remote server 460 or vector calculator requests that second mobile user 450 transfer the resource to mobile user 100. In one embodiment, mobile user 450 receives a sub-resource request that is transmitted to a Wi-Fi connection 454 associated with second mobile user 450. The sub-resource request provides appropriate information to second mobile user 450 so that the resource requested by mobile user 100 may be transmitted from second mobile user 450 to mobile user 100. In some embodiments, cache 452 associated with second mobile user 450 stores particular resources in a manner indicating second mobile user 450 is willing to share the resource with other mobile users. Portions of cache 452 also may be reserved for the private use of second mobile user 450. In this embodiment, cache 452 may have a shareable portion, for storage of resources that mobile user 450 is willing to share with other mobile users, and a non-shareable portion having protected resources of mobile user 450. In one embodiment, second mobile user 450 pays a discounted price for content downloading services if second mobile user 450 is willing to share certain resources once those resources have been downloaded. By transferring at least portions of requested resources between two mobile users, the network is free to accommodate other users without having to use network resources to accommodate mobile user 100's request. Further, the user-to-user transfers can occur at a higher rate of speed compared to transmissions from the network access points (e.g., devices 214, 224, 234, and 244). In one embodiment, user-to-user transfers occur at speeds at or greater than 10 megabits per second (Mbps). In another embodiment, user-to-user transfers occur transparently to one or both users. For example, mobile user 100 receives the requested resource, but is unaware the resource was provided by mobile user 450.

In another embodiment, the mobile user cache 452 described in conjunction with FIG. 7A is maintained in taxis, city buses, trains, airplanes, or the like. In this manner, these mobile vehicles operate as mobile caches to facilitate the downloading of requested resources by mobile users. Again, in one embodiment, the mobile users having some or all of their caches available for the receipt of requested resources and transmission thereof to other mobile users may receive a credit, payment, or the like for accommodating the public cache. Further, the distribution of frequently requested resources (e.g., weather and traffic reports), can be maintained on mobile caches in city buses, taxis, and the like. As a result, a mobile user in need of this resource can send the resource request into the network, and rapidly receive the resource from the bus or taxi next to them. In one embodiment, mobile user cache 452 is associated with a location determination device (such as a GPS device). In this manner, the data management system and/or vector controller can be aware of the location of mobile user cache 452.

In one embodiment, systems and methods of the present invention provide for the management of resources or content. In the embodiment shown in FIG. 7B, a mobile user 710 has a cache 712 coupled to a connection device 714. Mobile user 710 also may have a location determination device and/or GPS device as previously described. Mobile user 710 creates and provides a content report as represented by an arrow 716. In one embodiment, content report 716 is reported to a vector controller 750. Vector controller 750 may be similar to or identical to vector controllers 160, 164, 600. Vector controller 750 is able to communicate with mobile user 710 by way of a transmission device 740 and other components including switches, routers, modems, networks, and the like (not shown). Vector controller 750 is coupled to a database 755 for storing some or all of content report 716. In a preferred embodiment, database 755 contains content reports from a plurality of mobile users.

Figure 7B:
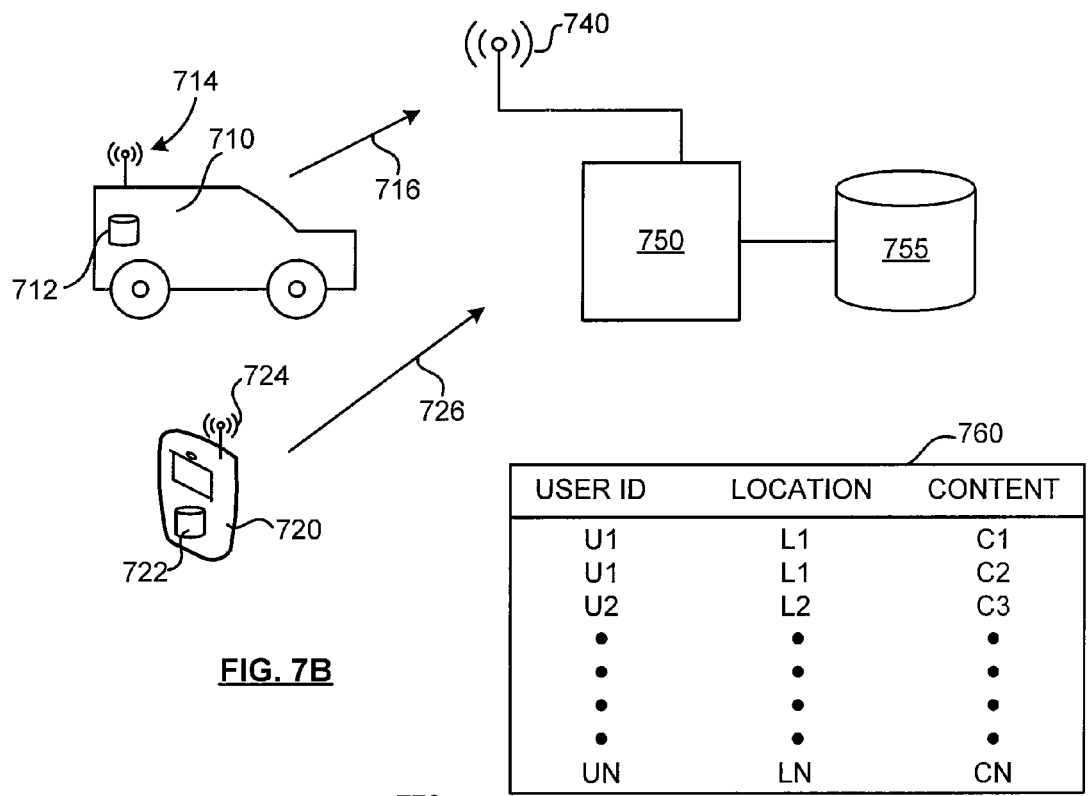
FIGS. 7B-7C are simplified schematics of a content management scheme for use with embodiments of the present invention.

A second mobile user 720 is depicted in FIG. 7B as a PDA or other hand-held device. Second mobile user 720 includes a cache 722 and a connection device 724, and also may contain a location determination device. Connection devices 714, 724 may, in one embodiment, comprise WiFi connections. In this embodiment, second mobile user 720 also provides a content report 726 to vector controller 750. Vector controller 750 then manages the collected content reports in database 755. In one embodiment, the content reports are managed in a table 760 as schematically depicted in FIG. 7B. Table 760 may include a user identifier (U1-UN), a user location when the content report was provided (L1-LN), and an identifier of the content available with the respective users (C1-CN). In one embodiment, content reports 716, 726 provide a content identifier that identifies the content stored in mobile caches 712, 722, which mobile users 710, 720 are willing to make available to other mobile users. In another embodiment, the content is transmitted with the content report and stored in database 755. As shown in table 760, each mobile user may have more than one piece of content that they either provide to database 755 or indicate they are willing to share with other mobile users. In some embodiments, content reports 716 and 726 are updated intermittently, periodically, or continuously so that database 755 maintains an accurate record of available content.

In the embodiment of FIG. 7B, mobile users requesting content C1, for example, may be provided with content C1 after vector controller 750 notifies user U1 that another mobile user has requested content C1. In this example, mobile user U1 is within transmission range of the requesting mobile user and the transmission of content C1 may occur from mobile user U1 to the requesting mobile user as schematically depicted in FIG. 7A. In another embodiment, the content is received from mobile user U1's transmission device 740, and rerouted to the requesting mobile user using vector controller 750 as previously described in conjunction with earlier embodiments. In this manner, the source of the requested content C1 may not be a stationary server or other storage mechanism, but may be a mobile user U1.

Figure 7C:
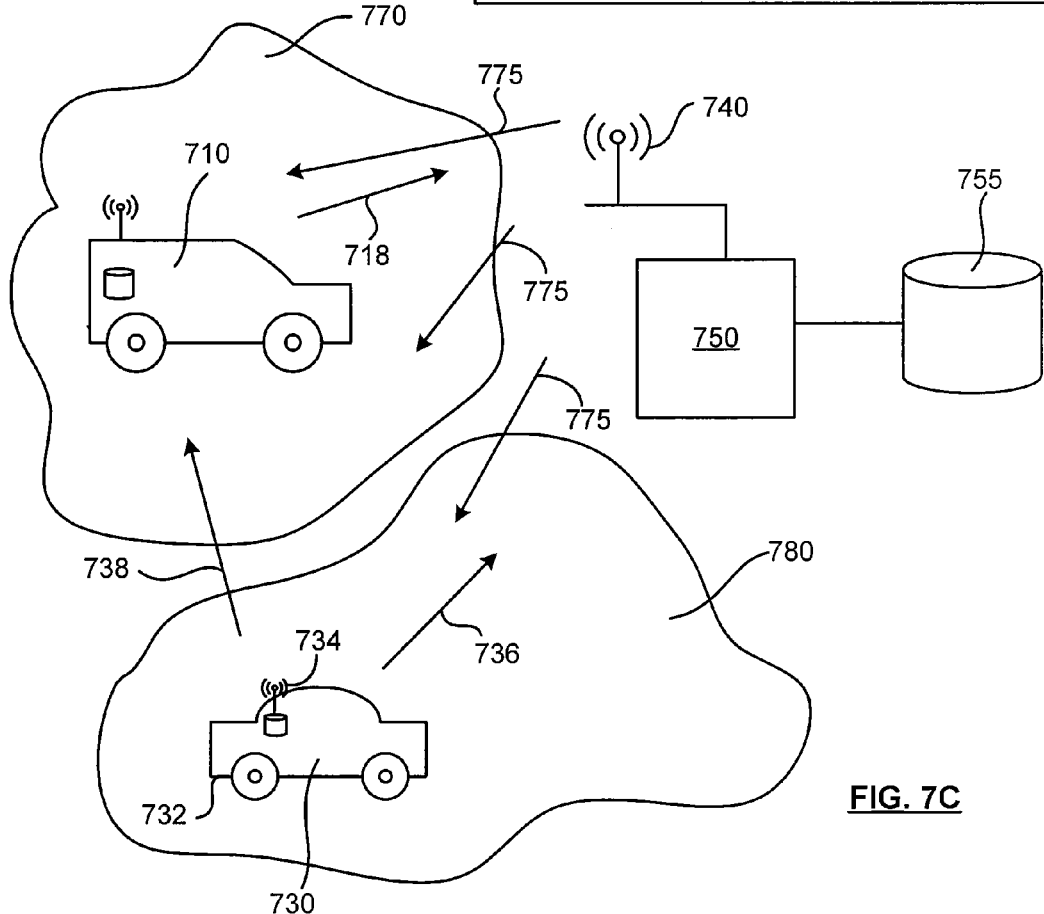

In an alternative embodiment depicted in FIG. 7C, user 710 issues a resource request 718 that is received by transmission device 740 and forwarded to vector controller 750 in a manner similar or identical to that described in conjunction with earlier figures. In this embodiment, vector controller 750 initiates a content request 775 that seeks mobile users in the vicinity of user 710 that may have the content or data requested in resource request 718. In one embodiment, transmission device 740 initiates content request 775 in a first network region or cell 770. This may be the same network region from which mobile user 710 initiated resource request 718. Such a content request will be particularly useful, for example, when mobile user 710 is at a fixed or stationary location such as in the parking structure described in conjunction with FIG. 4A. In another embodiment, vector controller 750 calculates the predicted path of mobile user 710 and sends content request 775 into one or more network cells or regions 780 which mobile user 710 is expected to enter in the future. In one embodiment, the requested content is possessed by a mobile user 730 in region 780. Mobile user 730 includes a cache 732 and a transmission or connection device 734. In this manner, the resource may be transmitted from user 730 to mobile user 710 when user 710 enters network region 780. Alternatively, mobile user 730 sends the requested resource to mobile user 710 while the two users are in different network regions 770, 780, provided the transmission capability of transmission device 734 and the receiving capability of connection device 714 permit it.

In one embodiment, as indicated by arrow 736, mobile user 730 transmits either the requested content back to vector controller 750 or provides a response to vector controller 750 indicating that mobile user 730 has the resource requested by mobile user 710. Transmission of the requested resource from mobile user 730 to mobile user 710 may then occur by vector controller 750 controlling the routing of the resource through an intermediate network, to transmission device 740 and on to mobile user 710.

In one embodiment, vector controller 750 updates database 755 with a record of content provided by mobile user 730. In this manner, mobile user 730 may receive a credit or some other benefit as a result of user 730's willingness to provide requested content to mobile user 710. The benefits may include a wide range of items or services desirable to mobile users including, without limitation, free downloads of desired content, or the like. It will be appreciated by those skilled in the art that the user-to-user transmission embodiments described in conjunction with FIGS. 7A-7C are illustrated examples, and the systems and methods of the present invention are not limited thereby.

Notwithstanding the above description, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of responding to a resource request of a mobile user, the method comprising:
   receiving first and second location indicators for the mobile user, each of the first and second location indicators having a time associated therewith;
   calculating a mobile vector of the mobile user using the first and second location indicators;
   associating the mobile vector with a first network region and a second network region;
   determining a first data rate available for transmission of data to the mobile user in the first network region;
   determining a second data rate available for transmission of data to the mobile user in the second network region;
   calculating a first portion and a second portion of the requested resource using the mobile vector and at least one of the first and second data rates;
   sending the first portion of the requested resource to a first storage device in the first network region;
   sending the second portion of the requested resource to a second storage device in the second network region;
   sending the first portion of the requested resource to the user when the user is in the first network region;
   sending the second portion of the requested resource to the user when the user is in the second network region; and
   receiving at least one acknowledgement from the mobile user confirming receipt thereby of the first and second portions of the requested resource.

2. The method as in claim 1 wherein the resource request is a request for a data package.

3. The method as in claim 2 wherein the data package is selected from group of data packages comprising a movie, a game, an email message, a file, and a music selection.

4. The method as in claim 1 wherein the resource request is a request for a real time delivery of a data package.

5. The method as in claim 1 wherein the first and second location indicators each comprise a latitude, a longitude and a time stamp.

6. The method as in claim 5 wherein the first and second location indicators each further comprise an altitude.

7. The method as in claim 5 wherein at least one of the first and second location indicators comprises a direction.

8. The method as in claim 1 wherein the first and second storage devices comprise first and second caches.

9. The method as in claim 1 wherein calculating the mobile vector comprises calculating a speed and a direction of travel of the user based on the first and second location indicators and the times associated therewith.

10. The method as in claim 9 wherein associating the mobile vector with the first and second network regions comprises determining a predicted path of the mobile user based at least in part on the mobile vector, and mapping the predicted path onto one or more regions of a network, the network including the first and second network regions.

11. The method as in claim 9 wherein associating the mobile vector with the first and second network regions comprises comparing the calculated mobile vector with a known prior path of the mobile user, the known prior path having at least portions thereof which pass through the first and second network regions.

12. The method as in claim 1 wherein the calculating of the first and second portions depends at least in part on predicted first and second lengths of time the mobile user will be in the first and second network regions, respectively.

13. The method as in claim 1 wherein the first and second network regions are part of a wireless network having a plurality of regions.

14. The method as in claim 1 further comprising receiving a plurality of location indicators for the mobile user, and recalculating the mobile vector a plurality of times.

15. The method as in claim 14 further comprising updating a predicted path of the mobile user based at least in part on the recalculating of the mobile vector.

16. The method as in claim 1 wherein the first storage device comprises a server at a fixed location.

17. The method as in claim 1 wherein the first storage device comprises a mobile storage device disposed with a second mobile user.

18. The method as in claim 1, wherein receiving at least one acknowledgement from the mobile user comprises re-sending the first portion of the requested resource to a subsequent storage device in a subsequent network region that is subsequent to the first network region if the at least one acknowledgement is not received when the mobile user is in the first network region.

19. A method of responding to a resource request of a mobile user, the method comprising:
 receiving first and second location indicators for the mobile user, each of the first and second location indicators having a time associated therewith;
 calculating a mobile vector of the mobile user, wherein the mobile vector comprises a known mobile user position portion and a predicted mobile user position portion;
 associating the mobile vector with a first network region and a second network region;
 determining a first data rate available for transmission of data to the mobile user in the first network region;
 determining a second data rate available for transmission of data to the mobile user in the second network region;
 calculating a first segment and a second segment of the requested resource using the mobile vector and at least one of the first and second data rates;
 sending the first segment of the requested resource to the user when the user is in the first network region;
 sending the second segment of the requested resource to a storage device in the second network region;
 sending the second segment of the requested resource to the user from the storage device when the user is in the second network region;
 receiving at least one acknowledgement from the mobile user confirming receipt thereby of a subset of the first segment of the requested resource; and
 sending a remaining subset of the first segment of the requested resource to the storage device in the second network region.

20. The method as in claim 19 wherein at least a portion of the second segment of the requested resource is sent to the storage device in the second network region before the mobile user is in the second network region.

21. The method as in claim 19 wherein associating the mobile vector with the first and second network regions comprises mapping the predicted mobile user position portion onto one or more regions of a network, the network including the first and second network regions.

22. The method as in claim 19 wherein the predicted mobile user position is a stationary position.

23. The method as in claim 19 wherein calculating the mobile vector comprises determining the predicted mobile user position portion by comparing the known mobile user position portion with a map.

24. The method as in claim 19 wherein calculating the mobile vector comprises determining the predicted mobile user position portion by comparing the known mobile user position portion with a known prior path of the mobile user.

25. The method as in claim 19 further comprising sending the remaining subset of the first segment of the requested resource to the mobile user when the 26. The method as in claim 19, wherein receiving at least one acknowledgement from the mobile user comprises re-sending the subset of the first segment of the requested resource to a subsequent storage device in a subsequent network region that is subsequent to the first network region if the at least one acknowledgement is not received when the mobile user is in the first network region. mobile user is in the second network region.

27. A non-transitory computer readable medium including computer program code for receiving a resource request of a mobile user through a wireless network, the computer readable medium comprising: code for receiving first and second location indicators for the mobile user, each of the first and second location indicators having a time associated therewith; code for calculating a mobile vector of the mobile user using the first and second location indicators; code for associating the mobile vector with a first network region and a second network region; code for determining a first data rate available for transmission of data to the mobile user in the first network region; code for determining a second data rate available for transmission of data to the mobile user in the second network region; code for calculating first and second portions of the requested resource based at least in part on the mobile vector and a data rate at which the mobile user can receive data; at least one of the first and second data rates; code for sending the first portion of the requested resource to a first storage device in the first network region for delivery to the mobile user when the user is in the first network region; and code for sending the second portion of the requested resource to a second storage device in the second network region for delivery to the mobile user when the user is in the second network region; and code for receiving at least one acknowledgment confirming receipt of either the first portion or the second portion of the requested resource.

28. The non-transitory computer readable medium as in claim 27 wherein the code for associating the mobile vector with the first and second network regions comprises: code for determining a predicted path of the mobile user based at least in part on the mobile vector; and code for mapping the predicted path onto one or more regions of the network, the network including the first and second network regions.

29. The non-transitory computer readable medium as in claim 27 wherein the code for calculating the mobile vector calculates a known mobile user position portion of the mobile vector using at least the first and second location indicators, and calculates a predicted mobile user position portion of the mobile vector.

30. The non-transitory computer readable medium as in claim 29 wherein the code for calculating the predicted mobile user position portion compares the known mobile user position portion with a map.

31. The non-transitory computer readable medium as in claim 29 wherein the code for calculating the predicted mobile user position portion compares the known mobile user position portion with a known prior path of the mobile user.

32. A computer system for facilitating data transfer to a mobile user, the system comprising:
 a processor coupled to a database;
 a computer readable medium coupled to the processor, the computer readable medium comprising:
  code for receiving a resource request of a mobile user through a wireless network;
  code for receiving first and second location indicators for the mobile user, each of the first and second location indicators having a time associated therewith;
  code for calculating a mobile vector of the mobile user using the first and second location indicators;
  code for associating the mobile vector with a first network region and a second network region;
  code for determining a first data rate available for transmission of data to the mobile user in the first network region;
  code for determining a second data rate available for transmission of data to the mobile user in the second network region;
  code for calculating first and second portions of the requested resource based at least in part on the mobile vector and at least one of the first and second data rates;
  code for sending the first portion of the requested resource to a first storage device in the first network region for delivery to the mobile user when the user is in the first network region;

code for sending the second portion of the requested resource to a second storage device in the second network region for delivery to the mobile user when the user is in the second network region; and code for receiving at least one acknowledgment confirming receipt of either the first portion or the second portion of the requested resource.

* * * * *

UNITED STATES PATENT AND TRADEMARK OFFICE
CERTIFICATE OF CORRECTION

PATENT NO.         : 8,005,483 B2
APPLICATION NO.    : 10/976022
DATED              : August 23, 2011
INVENTOR(S)        : Steven M. Casey et al.

It is certified that error appears in the above-identified patent and that said Letters Patent is hereby corrected as shown below:

Column 7, Line 43, delete "tone embodiment," and insert -- one embodiment, --, therefor.

Column 10, Line 14, delete "resources., Again, these" and insert -- resources. Again, these --, therefor.

Column 17, Claim 25, Lines 54-56, delete "The method as in claim 19 further comprising sending the remaining subset of the first segment of the requested resource to the mobile user when the" and insert -- The method as in claim 19 further comprising sending the remaining subset of the first segment of the requested resource to the mobile user when the mobile user is in the second network region. --, therefor.

Column 17, Claim 26, Lines 57-64, delete "The method as in claim 19, wherein receiving at least one acknowledgement from the mobile user comprises resending the subset of the first segment of the requested resource to a subsequent storage device in a subsequent network region that is subsequent to the first network region if the at least one acknowledgement is not received when the mobile user is in the first network region, mobile user is in the second network region." and insert -- The method as in claim 19, wherein receiving at least one acknowledgement from the mobile user comprises resending the subset of the first segment of the requested resource to a subsequent storage device in a subsequent network region that is subsequent to the first network region if the at least one acknowledgement is not received when the mobile user is in the first network region. --, therefor.

Signed and Sealed this
Twenty-ninth Day of May, 2012

David J. Kappos
*Director of the United States Patent and Trademark Office*